(12) United States Patent
Kadosh et al.

(10) Patent No.: US 9,787,534 B1
(45) Date of Patent: Oct. 10, 2017

(54) SYSTEM, METHOD, AND COMPUTER PROGRAM FOR GENERATING EVENT TESTS ASSOCIATED WITH A TESTING PROJECT

(71) Applicant: Amdocs Software Systems Limited, Dublin (IE)

(72) Inventors: Meni Kadosh, Ashkelon (IL); Gilli Shama, Raanana (IL); Ravit Shapira, Tel-Aviv (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 120 days.

(21) Appl. No.: 14/597,439

(22) Filed: Jan. 15, 2015

(51) Int. Cl.
*H04L 12/24* (2006.01)
*H04L 12/26* (2006.01)
*H04W 24/00* (2009.01)

(52) U.S. Cl.
CPC ........... *H04L 41/069* (2013.01); *H04L 43/50* (2013.01); *H04W 24/00* (2013.01)

(58) Field of Classification Search
CPC ... H04L 43/50; H04L 12/2697; H04L 41/069; H04L 24/00; H04L 12/40169; H04L 41/06; H04L 43/0823
See application file for complete search history.

(56) References Cited

U.S. PATENT DOCUMENTS

| | | | |
|---|---|---|---|
| 5,488,648 A * | 1/1996 | Womble | H04M 3/2254 379/10.02 |
| 7,505,567 B1 | 3/2009 | Eslambolchi et al. | |
| 2013/0311977 A1* | 11/2013 | Nieminen | G06F 11/3672 717/135 |
| 2014/0096187 A1* | 4/2014 | Shang | G06F 21/50 726/1 |

FOREIGN PATENT DOCUMENTS

| | | |
|---|---|---|
| CA | 2034600 A1 | 8/1991 |
| WO | 00/76188 A1 | 12/2000 |

* cited by examiner

*Primary Examiner* — Noel Beharry
*Assistant Examiner* — Ruihua Zhang
(74) *Attorney, Agent, or Firm* — Zilka-Kotab, PC

(57) ABSTRACT

A system, method, and computer program product are provided for generating event tests associated with a testing project. In use, an indication of one or more event types is received for creating one or more events on which to perform event testing associated with at least one testing project. Additionally, an indication of one or more parameters associated with the one or more events on which to perform the event testing is received. Further, one or more event files are generated for testing the one or more events based on the one or more event types and the one or more parameters. In addition, the one or more event files are sent to one or more event processing systems for testing the one or more events, the testing of the one or more events including storing information associated with all faults resulting from the testing of the one or more events in a risky (Continued)

events repository that is capable of being utilized to generate testing rules for additional testing projects. Moreover, at least one report including information associated with a result of testing the one or more events is generated.

10 Claims, 8 Drawing Sheets

FIGURE 6

| Account | Account ID | Account Name | Project ID | Project Name |
|---|---|---|---|---|

| Event result | Event ID | Account ID | Project ID | System ID | System Name | Result |
|---|---|---|---|---|---|---|

| Events parameters | Event ID | Event Name | Description | Event type | Parameter ID | Parameter value |
|---|---|---|---|---|---|---|

| Parameters | Parameter ID | Parameter Name | Description | Sign | Parm Type | Data type | Default value | Possible values | Value creation function |
|---|---|---|---|---|---|---|---|---|---|

SYSTEM, METHOD, AND COMPUTER PROGRAM FOR GENERATING EVENT TESTS ASSOCIATED WITH A TESTING PROJECT

FIELD OF THE INVENTION

The present invention relates to telecommunication software testing, and more particularly to testing events in the context of telecommunication software testing.

BACKGROUND

Telecommunication related software testing involves event testing. An event can be any communication activity a customer can perform. For example, the events may include calls, sending/receiving an SMS, sending/receiving an MMS, data usage (e.g. Internet usage), and various other events.

Currently, testers must manually generate an event occurrence to test by manually populating an event data template file with testing parameters and sending the generated event occurrence to a relevant processing system. This process is time consuming and error prone. Moreover, testers do not have easy access to past event testing data such that current event testing may be modified based on previous test experience.

There is thus a need for addressing these and/or other issues associated with the prior art.

SUMMARY

A system, method, and computer program product are provided for generating event tests associated with a testing project. In use, an indication of one or more event types is received for creating one or more events on which to perform event testing associated with at least one testing project. Additionally, an indication of one or more parameters associated with the one or more events on which to perform the event testing is received. Further, one or more event files are generated for testing the one or more events based on the one or more event types and the one or more parameters. In addition, the one or more event files are sent to one or more event processing systems for testing the one or more events, the testing of the one or more events including storing information associated with all faults resulting from the testing of the one or more events in a risky events repository that is capable of being utilized to generate testing rules for additional testing projects. Moreover, at least one report including information associated with a result of testing the one or more events is generated.

BRIEF DESCRIPTION OF THE DRAWINGS

FIG. 6 illustrates data tables stored by a risky events repository, in accordance with one embodiment.

DETAILED DESCRIPTION

Figure 1:
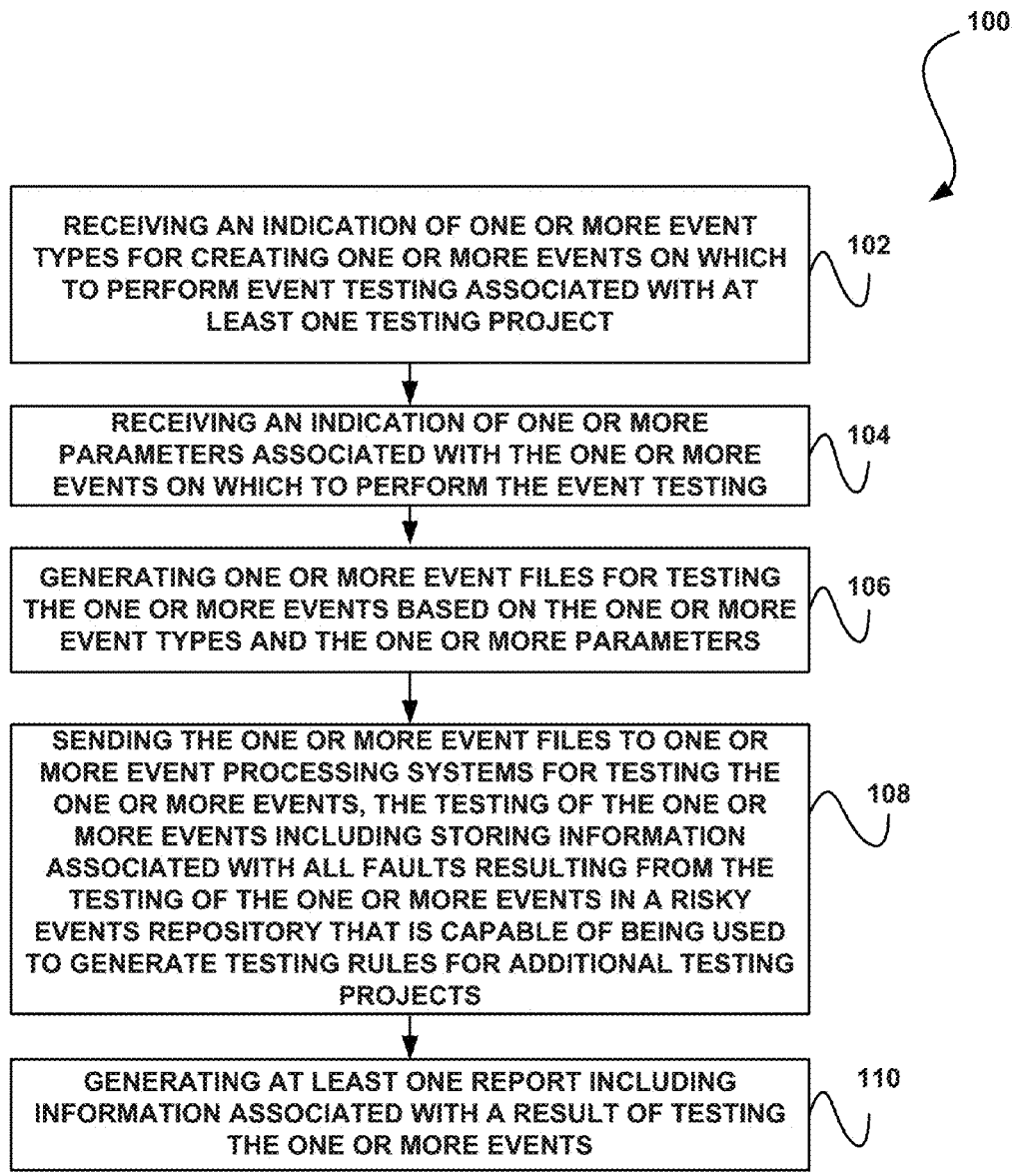
FIG. 1 illustrates a method for generating event tests associated with a testing project, in accordance with one embodiment.

FIG. 1 illustrates a method 100 for generating event tests associated with a testing project, in accordance with one embodiment.

As shown, an indication of one or more event types is received for creating one or more events on which to perform event testing associated with at least one testing project. See operation 102.

The testing project may include any software related testing project associated with a telecommunication system, communication service provider, and/or any other associated entity. Additionally, the testing project may be a portion of a larger testing project or an entire testing project.

The events on which to perform event testing may be associated with any communication activity a telecommunication customer may perform. For example, in various embodiments, the events may include making or receiving a call, sending or receiving an SMS, sending or receiving an MMS, data usage events (e.g. Internet use, etc.), and various other events. Thus, the event types may include voice event types, data use event types, and messaging event types, etc.

Receiving the indication of the event types may occur in various ways. For example, in one embodiment, receiving the indication of event types for creating the events may include receiving a selection of one or more predefined event types from a user utilizing a user interface. In another embodiment, a user may input the event types utilizing the user interface. In another embodiment, event types may be automatically selected (e.g. based on one or more rules, etc.).

As shown further in FIG. 1, an indication of one or more parameters associated with the one or more events on which to perform the event testing is received. See operation 104. The parameters may include any data associated with an event. For example, the parameters may be associated with a call event. In this case, the parameters may include a calling number, a call duration, and a called number, etc. Of course, the parameters may include any parameter associated with calls, data usage, and/or messaging, etc.

Receiving the indication of the event types parameters may occur in various ways. For example, in one embodiment, receiving the indication of the parameters associated with the events on which to perform the event testing may include receiving a selection of one or more predefined parameters from a user utilizing a user interface. In another embodiment, a user may input the parameters utilizing the user interface. In another embodiment, the parameters may be automatically selected (e.g. based on one or more rules, etc.). The predefined parameters may include parameters selected from a pool of event parameters to be used for creating event data files and performing processing validation.

Additionally, in one embodiment, configuration information associated with the one or more parameters may also be received (e.g. from a user or automatically). In this case, the configuration information may indicate whether a value for a corresponding parameter will be populated manually or created automatically. In addition, the configuration information may include value formatting settings associated with a corresponding parameter.

As shown further in FIG. 1, one or more event files are generated for testing the one or more events based on the one or more event types and the one or more parameters. See operation 106. The event files may include various information for testing (e.g. parameters, rules, etc.) and may be in various formats (e.g. .DAT file, .DC file, etc.).

In addition to generating the event files for testing, a test plan defining all test cases for each of the one or more events may also be generated. In this case, a particular test case for a corresponding event may define one set of parameter values for testing the corresponding event.

Further, the one or more event files are sent to one or more event processing systems for testing the one or more events. See operation 108. The testing of the one or more events includes storing information associated with all faults resulting from the testing of the one or more events in a risky events repository that is capable of being utilized to generate testing rules for additional testing projects. The event processing systems may include any type of system for testing events and may include various hardware and software, etc.

The risky events repository may be one or more databases and/or memory systems. The risky events repository may include any type of historical data associated with testing events, including all relevant fault data (and associated information) from previous tests.

For example, storing the information associated with all faults resulting from the testing of the events in the risky events repository may include storing parameter information associated with a test of a corresponding event, storing event information associated with a test of a corresponding event, and/or storing information associated with the testing project (e.g. a project ID, etc.).

In one embodiment, the testing of the events may include utilizing one or more rules generated utilizing historical testing data stored in the risky events repository. In this case, the rules may be periodically or regularly updated utilizing updated testing data stored in the risky events repository.

With further reference to FIG. 1, at least one report including information associated with a result of testing the one or more events is generated. See operation 110. The report may include any information associated with the testing of the events, including success, failure, and error information.

In one embodiment, the method 100 may further include executing a learning algorithm that compares patterns associated with parameters corresponding to errors that caused a fault with parameters corresponding to errors that did not cause a fault. In this case, a test may be created utilizing rules determined based on the comparison.

In another embodiment, data stored in the risky events repository may be utilized to identify combinations of parameter values that are prone to errors. In this case, one or more testing rules may be generated based on the identified combinations of parameter values that are prone to errors.

It should be noted that operations 106-110 of the method 100 may occur automatically in response to a user initiating such operations utilizing a user interface. Accordingly, the method 100 may be utilized to automate the events generation process. The method 100 may include utilizing an event testing framework that automates the events generation process to allow large volumes of events testing with low events structure knowledge and minimal effort. Moreover, testing of such events may be based on rules generated utilizing historical event testing data (e.g. stored in the risky events repository, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
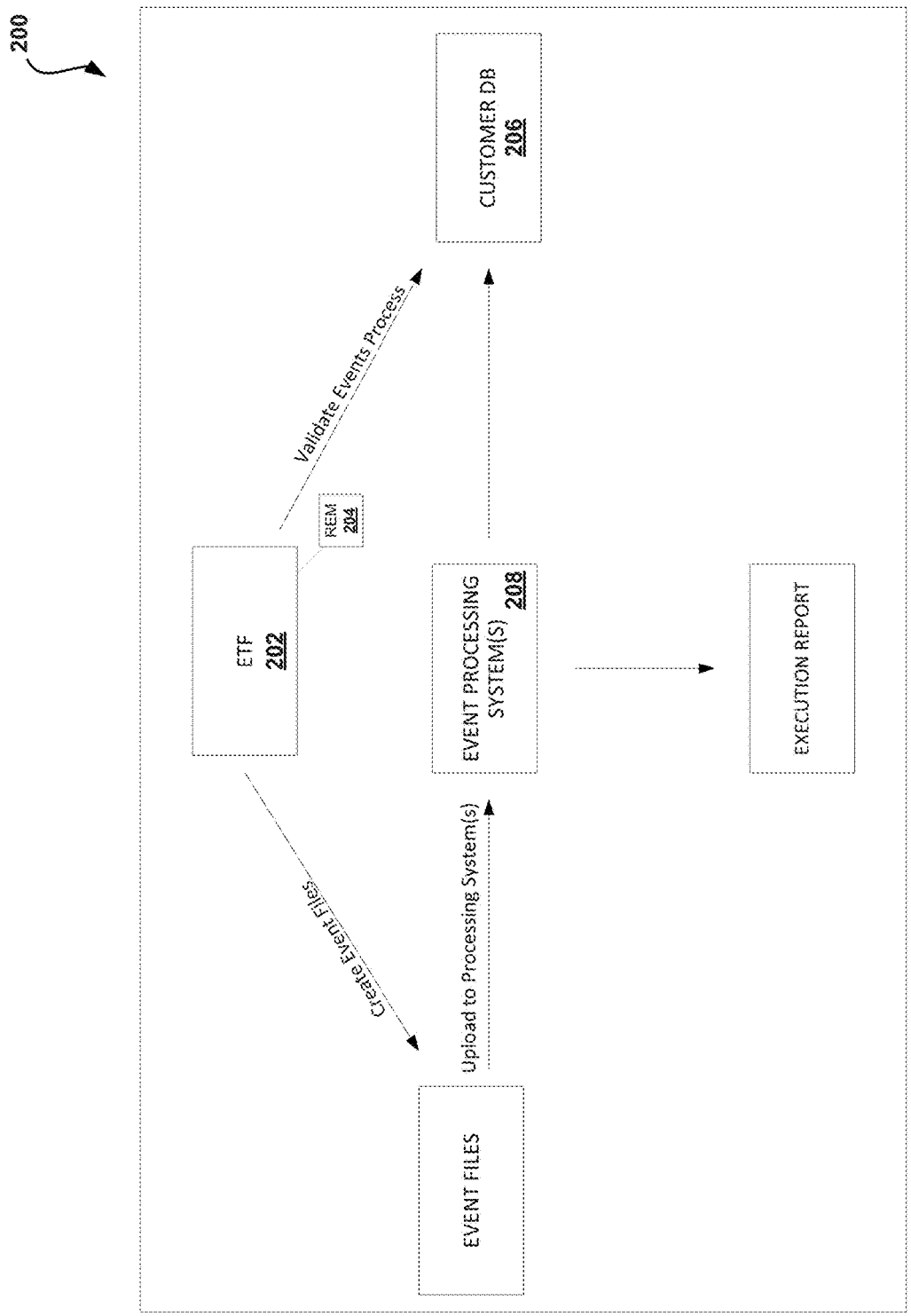
FIG. 2 illustrates a system for generating event tests associated with a testing project, in accordance with one embodiment.

FIG. 2 illustrates a system 200 for generating event tests associated with a testing project, in accordance with one embodiment. As an option, the system 200 may be implemented in the context of the details of FIG. 1. Of course, however, the system 200 may be implemented in the context of any desired environment. Further, the aforementioned definitions may equally apply to the description below.

Telecommunication related software testing involves event testing. An event can be any communication activity the customer can perform. For example, the events may include calls, sending/receiving an SMS, sending/receiving an MMS, data usage (e.g. Internet use), and various other events. An event includes details. For example, details for a call event may include a calling number, a call duration, and a called number. The details of the event are recorded in real time and sent to the relevant processing system. Testers typically generate an event occurrence by populating an event data template file with tested parameters and sending it to the processing system.

In operation, the system 200 may be utilized to automate the events generation process. As shown, the system includes an event testing framework (ETF) 202 (e.g. a software application, computer code, etc.) that automates the events generation process to allow large volumes of events testing with low events structure knowledge and minimal effort.

In one embodiment, the system 200 may utilize a risky events machine (REM) 204 to identify patterns of events that are likely to cause a defect by learning features of parameters (per event type) that caused defects in past projects. The risky events machine 204 may include various software and/or hardware and may be capable of accessing a risky events repository, which may be represented by a customer database 206 or another separate repository (not shown).

In operation, the event testing framework 202 may function to automatically create event files utilizing user selected (or automatically selected) event types and associated parameters and send the generated event files to one or more event processing systems 208. Results of the event processing may be sent to the customer database 206 and used to generate various reports.

The event testing framework 202 reduces testing effort and time, while increasing test coverage and quality, by supporting all event testing related actions. In one embodiment, the event testing framework 202 may utilize all the relevant event processing testing phases: usage file creation, usage file upload to the processing system and usage file processing validations.

The configuration module configures file templates, parameters, and validations for all event types and testing environments relevant to the project, using a fully generic mechanism. This includes configuring (per each event type) a pool of event parameters that may be used for creating the event data file and running the processing validation.

For each parameter, the event testing framework 202 allows a user to configure an associated value source, manual or automatic, indicating whether the value will be populated manually by the user or whether the value will be created automatically by the event testing framework 202. If the value is created automatically, the value may be obtained from a database or a random value generator, etc. The configuring of the associated value source may also include configuring value formatting settings. The event testing framework 202 may be associated with various graphical user interfaces to facilitate configuration, etc.

The event testing framework 202 may also allow configuration of an event template data file, which is built by static values and parameters (e.g. or parameter signs which will be replaced by actual testing data in execution). The event testing framework 202 may support ASCII (text) and binary file formats, etc. The event testing framework 202 may also allow configuration of a pool of processing validation SQLs with an expected returned value.

The test plan module allows configuration of each event type for all possible test cases. A test case is one set of parameters values. In one embodiment, test case data may be formatted/loaded quickly using a duplicate and export to or import from spreadsheet functionality accessible via a user interface.

The test plan module also allows creating and designing execution test sets. A test set is a flow of different event type's execution. For each event type execution, the event testing framework 202 allows configuring of which test cases will be executed along with other execution options.

The execution module facilitates execution by automatic creation of many event data files from different types and sending them to be processed. The execution module allows configuration of which test sets to execute and on which testing environment (e.g. test sets may be executed on two environments in parallel, etc.). The execution module provides high level details on execution status and results. The event testing framework 202 stores all execution files and details and allows viewing of such files/details at the end of test execution.

The reports module facilities the generation of execution reports with full details, such as creation status, validation status, etc. The event testing framework 202 allows customizing the report per need and allows viewing of the report on a user interface. The event testing framework 202 may also allow for exporting the report to a spread sheet.

In one embodiment, the risky events machine 204 may utilize a combination of a risky events repository and a machine learning algorithm to perform various analysis, etc. The risky events repository stores the details of events in which the validation process has failed, for the improvement of future projects.

The risky events machine 204 may include (or utilize) an algorithm that learns about error patterns from the risky events repository. Risk rules may then be generated that define the frequency for creating events on new projects, even in new accounts, based on the analysis of the risky events repository.

The risky events repository may store all the details of events that reported a fault (i.e. validation process failed), in any project. In one embodiment, the risky events repository may store only fault causing events, as most tested events do not cause an error (e.g. fault rates are typically 10%-20%). For the fault event and each past usage, the risky events repository may store the project ID, the tested business process and system, and the test result (pass or fault).

In one embodiment, the risky events repository may be used for duplication of the same event on new projects. For example, events may be re-tested in future regression testing of the same account in the same tested system. Events that have a failure rate percent above a threshold in a specific system may be mandatory in testing the next implementation of the system.

As an example, an event Ex that failed 50% of the time may have been tested on system X. Event Ex, within various accounts and business processes, will now be tested on the next implementation of system X. If this event Ex now passes and its failure rate drops below 50%, it may not be mandatory on the next testing of system X.

In one embodiment, the learning algorithm used by the risky events machine 204 may run at the end of each project on all events (regardless of fault or pass) and compare between patterns in parameters of errors that caused a fault with errors that did not cause a fault. Such an algorithm is based on discriminant analysis. For example, finding that a call to a specific destination country has twice the likelihood to cause an error compared to a local call may direct a rule to create twice the events with the specific destination country.

The algorithm may also look for clusters or combinations of parameter values that are especially prone to errors, such as a connection between the call origin and the destination country. Rules from previous projects may be compared against the new project's results when new learning data, and may be refined.

For example, the risky events machine 204 may determine that a call to a specific destination country is a source of error if the call is a long duration. Rules from the latest ended project may be compared against the risky events repository to be refined.

Figure 3:
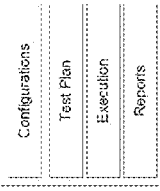
FIG. 3 illustrates a user interface for event type parameter configuration, in accordance with one embodiment.

FIG. 3 illustrates a user interface 300 for event type parameter configuration, in accordance with one embodiment. As an option, the user interface 300 may be implemented in the context of the details of the previous figures. Of course, however, the user interface 300 may be implemented in the context of any desired environment. Further, the aforementioned definitions may equally apply to the description below.

The user interface 300 may be part of the event testing framework (e.g. the event testing framework 202 of FIG. 2) and may be used by a user to configure parameters associated with events to be tested.

Figure 4:
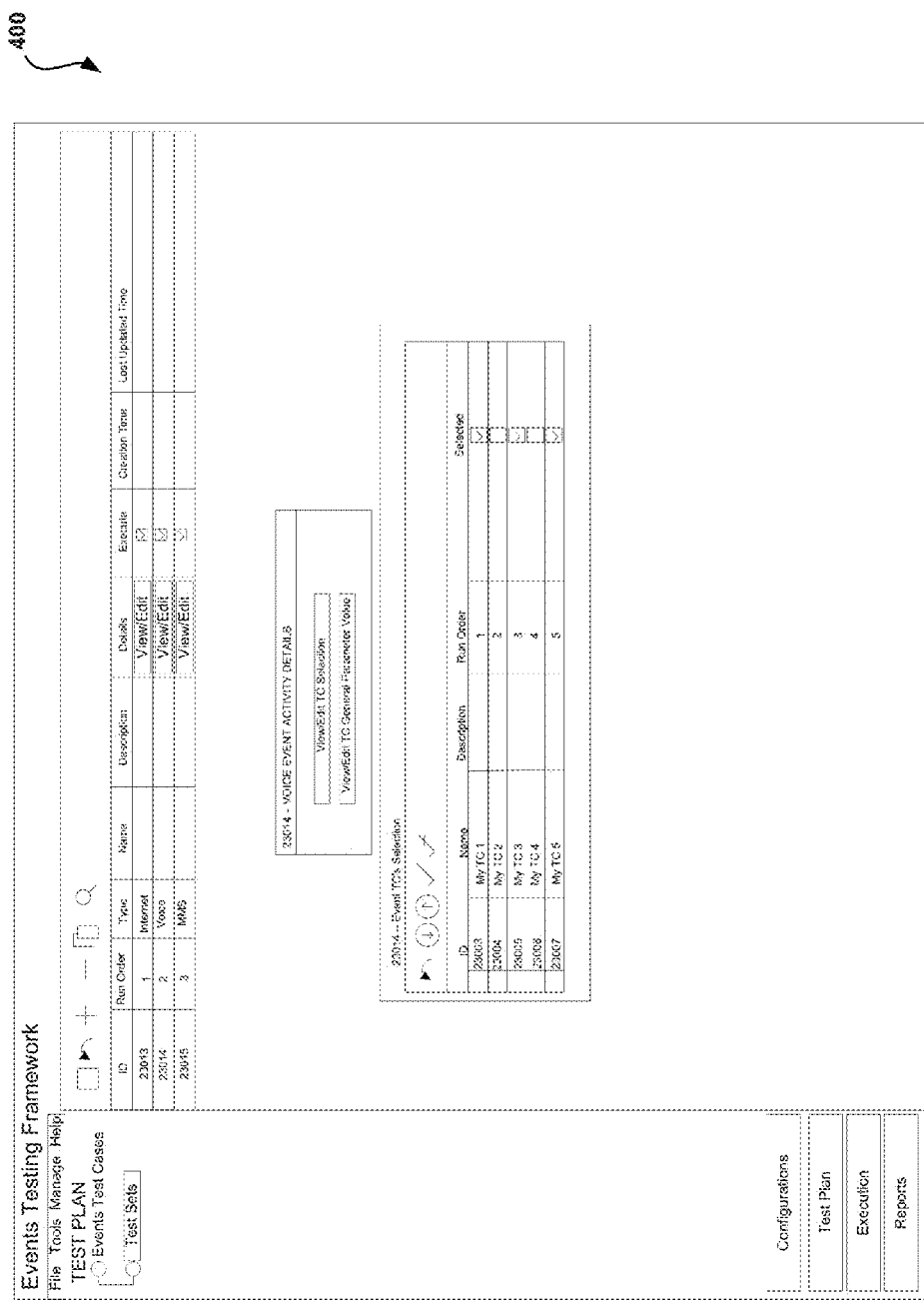
FIG. 4 illustrates a user interface for test set design, in accordance with one embodiment.

FIG. 4 illustrates a user interface 400 for test set design, in accordance with one embodiment. As an option, the user interface 400 may be implemented in the context of the details of the previous figures. Of course, however, the user interface 400 may be implemented in the context of any desired environment. Further, the aforementioned definitions may equally apply to the description below.

The user interface 400 may be part of the event testing framework (e.g. the event testing framework 202 of FIG. 2) and may be used by a user to select test cases associated with events to be tested. The user interface 400 may also be used to select an order in which the test cases are executed.

Figure 5:
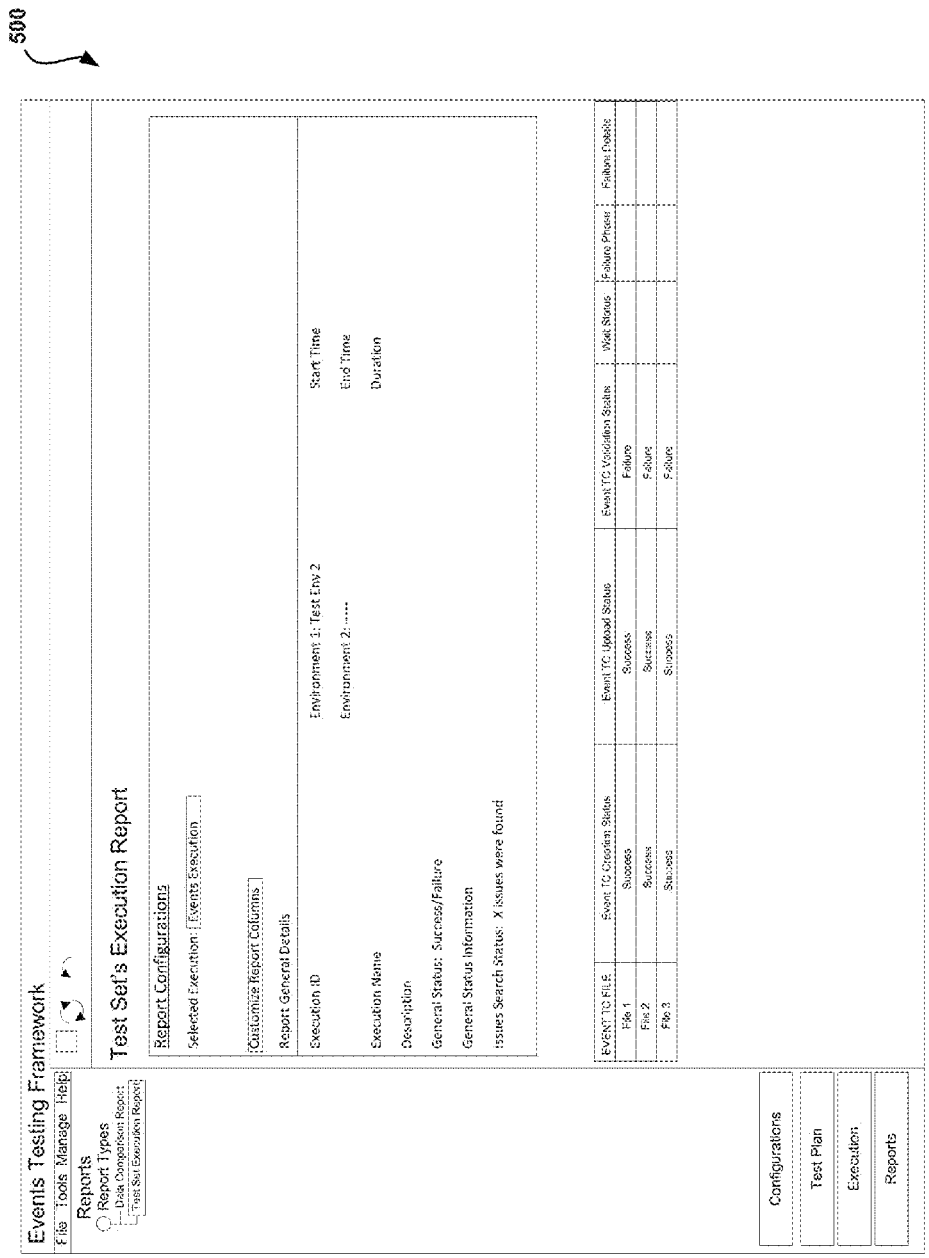
FIG. 5 illustrates a user interface showing an execution report, in accordance with one embodiment.

FIG. 5 illustrates a user interface 500 showing an execution report, in accordance with one embodiment. As an option, the user interface 500 may be implemented in the context of the details of the previous figures. Of course, however, the user interface 500 may be implemented in the context of any desired environment. Further, the aforementioned definitions may equally apply to the description below.

The user interface 500 may be part of the event testing framework (e.g. the event testing framework 202 of FIG. 2) and may display results associated with events testing. The user interface 500 may be used to display results for a selected execution. The results may include success/failure results for each test case.

FIG. 6 illustrates data tables 600 stored in the risky events repository, in accordance with one embodiment. As an option, the data tables 600 may be implemented in the context of the details of the previous figures. Of course, however, the data tables 600 may be implemented in the context of any desired environment. Further, the aforementioned definitions may equally apply to the description below.

The data tables 600 may be stored in the risky events repository. As shown, the data tables may include information associated with parameters, events, results, and the associated project.

Figure 7:
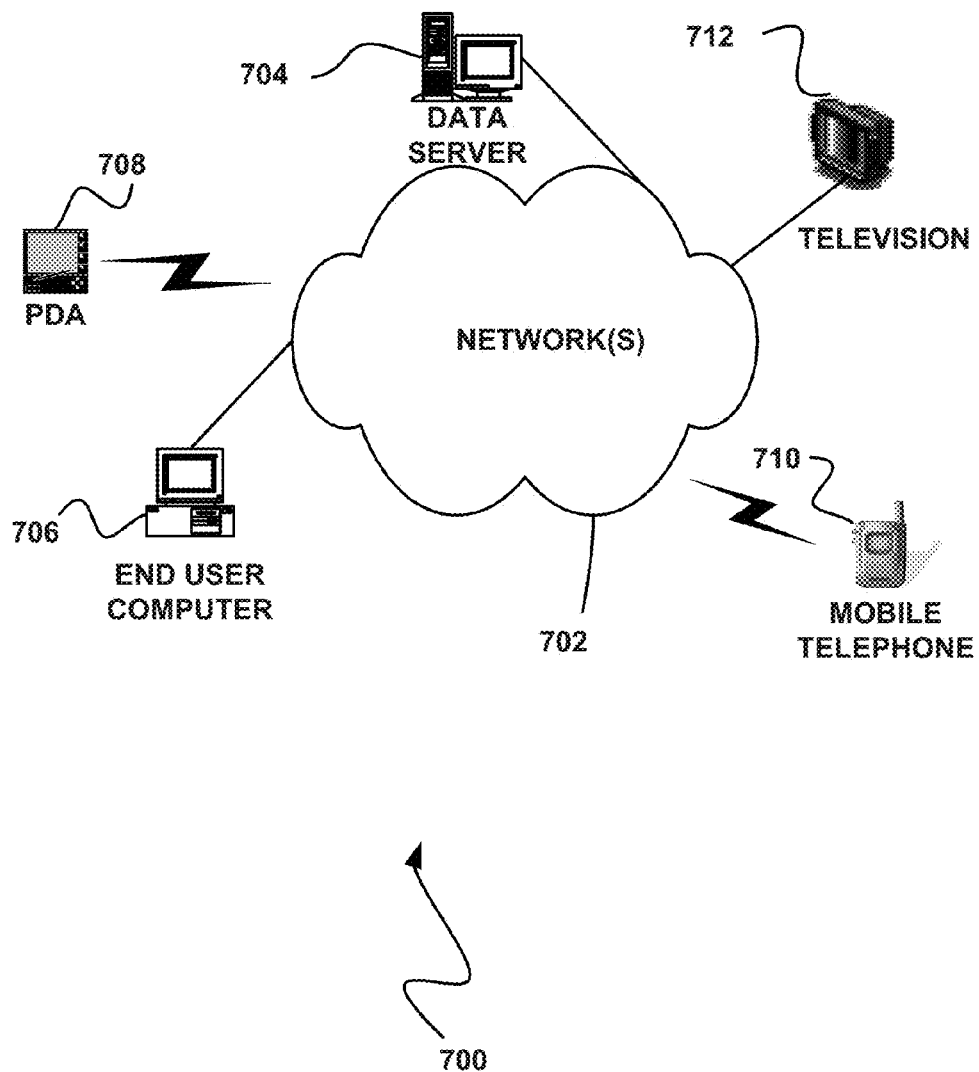
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
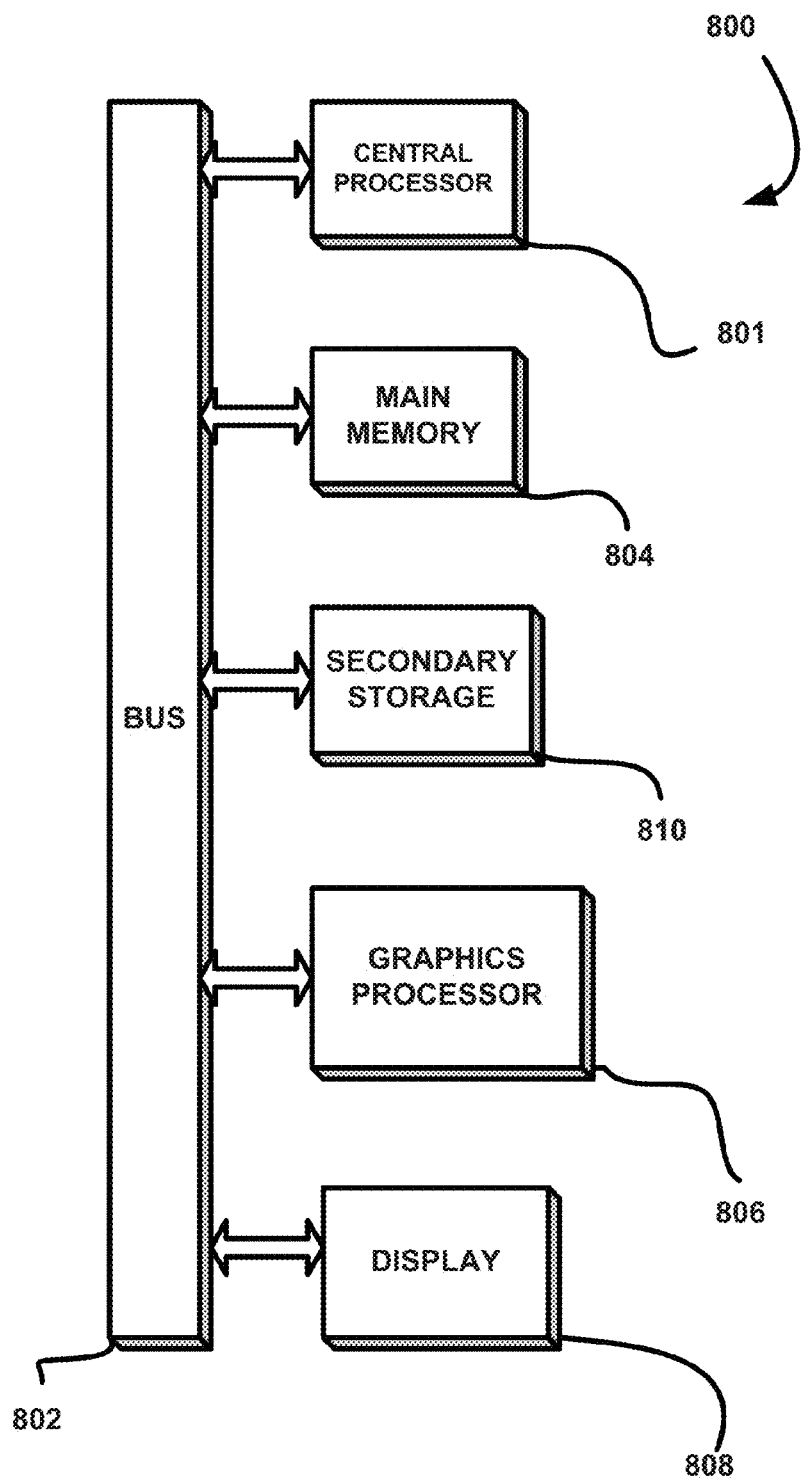
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving, by a computer system, an indication of one or more event types for creating one or more events on which event testing associated with at least one testing project associated with communication activities in a telecommunication network is to be performed;
   computer code for receiving, by the computer system, an indication of one or more parameters associated with each of the one or more events on which the event testing is to be performed;
   computer code for receiving, by the computer system, configuration information for the one or more parameters associated with each of the one or more events on which the event testing is to be performed, the configuration information for each of the one or more parameters indicating whether a value of the parameter will be populated manually by a user or whether the value will be created automatically by the computer system;
   computer code for automatically generating, by the computer system based on the one or more event types, the one or more parameters, and the configuration information, one or more event files for executing the one or more events;
   computer code for sending, by the computer system, the one or more event files to one or more event processing systems for testing the one or more events, the testing of the one or more events including:
      executing the one or more events through the one or more event files,
      testing the one or more events, using a first set of testing rules, to identify faults resulting from the testing of the one or more events, and
      storing, in a risky events repository, details of only each of the one or more events that resulted in one of the identified faults, the details of each of the one or more events including:
         an identification of the testing project,
         an identification of the event, and
         an identification of the one or more parameters associated with the event and values of the one or more parameters;
   computer code for generating, by the computer system, at least one report including a result of the testing of the one or more events;
   computer code for identifying, by the computer system from the details stored in the risky events repository, combinations of the values of the one or more parameters that are prone to errors;
   computer code for automatically generating, by the computer system, a second set of testing rules based on the identified combinations of the values of the one or more parameters that are prone to errors; and
   computer code for generating, by the computer system, one or more additional testing projects including:
      using the details of the one or more events stored in the risky events repository to duplicate in the one or more additional testing projects at least a portion of the one or more events that resulted in one of the identified faults, wherein the one or more events that have a failure rate percent above a threshold in a specific system may be mandatory in testing next implementation of the system, and including the second set of testing rules in the one or more additional testing projects to test the duplicated one or more events.

2. The computer program product of claim 1, wherein the computer program product is operable such that receiving the indication of the one or more event types for creating the one or more events includes receiving a selection of one or more predefined event types from a user utilizing a user interface.

3. The computer program product of claim 1, wherein the computer program product is operable such that receiving the indication of the one or more parameters associated with the one or more events on which to perform the event testing includes receiving a selection of one or more predefined parameters from a user utilizing a user interface.

4. The computer program product of claim 3, wherein the computer program product is operable such that the one or more predefined parameters include parameters selected from a pool of event parameters to be used for creating event data files and performing processing validation.

5. The computer program product of claim 1, wherein the computer program product is operable such that the configuration information includes value formatting settings for each of the one or more parameters.

6. The computer program product of claim 1, further comprising computer code for generating a test plan defining all test cases for each of the one or more events.

7. The computer program product of claim 6, wherein the computer program product is operable such that a particular test case for a corresponding event defines one set of parameter values for testing the corresponding event.

8. A method, including:
receiving, by a computer system, an indication of one or more event types for creating one or more events on which event testing associated with at least one testing project associated with communication activities in a telecommunication network is to be performed;
receiving, by the computer system, an indication of one or more parameters associated with each of the one or more events on which the event testing is to be performed;
receiving, by the computer system, configuration information for the one or more parameters associated with each of the one or more events on which the event testing is to be performed, the configuration information for each of the one or more parameters indicating whether a value of the parameter will be populated manually by a user or whether the value will be created automatically by the computer system;
automatically generating, by the computer system based on the one or more event types, the one or more parameters, and the configuration information, one or more event files for executing the one or more events;
sending, by the computer system, the one or more event files to one or more event processing systems for testing the one or more events, the testing of the one or more events including:
executing the one or more events through the one or more event files,
testing the one or more events, using a first set of testing rules, to identify faults resulting from the testing of the one or more events, and
storing, in a risky events repository, details of only each of the one or more events that resulted in one of the identified faults, the details of each of the one or more events including:
an identification of the testing project,
an identification of the event, and
an identification of the one or more parameters associated with the event and values of the one or more parameters;
generating, by the computer system, at least one report including a result of the testing of the one or more events;
identifying, by the computer system from the details stored in the risky events repository, combinations of the values of the one or more parameters that are prone to errors;
automatically generating, by the computer system, a second set of testing rules based on the identified combinations of the values of the one or more parameters that are prone to errors; and
generating, by the computer system, one or more additional testing projects including:
using the details of the one or more events stored in the risky events repository to duplicate in the one or more additional testing projects at least a portion of the one or more events that resulted in one of the identified faults, wherein the one or more events that have a failure rate percent above a threshold in a specific system may be mandatory in testing next implementation of the system, and
including the second set of testing rules in the one or more additional testing projects to test the duplicated one or more events.

9. A computer system comprising:
a memory system; and
one or more processing cores coupled to the memory system and that are each configured to:
receive an indication of one or more event types for creating one or more events on which event testing associated with at least one testing project associated with communication activities in a telecommunication network is to be performed;
receive an indication of one or more parameters associated with each of the one or more events on which the event testing is to be performed;
receive configuration information for the one or more parameters associated with each of the one or more events on which the event testing is to be performed, the configuration information for each of the one or more parameters indicating whether a value of the parameter will be populated manually by a user or whether the value will be created automatically by the computer system;
automatically generate, based on the one or more event types, the one or more parameters, and the configuration information, one or more event files for executing the one or more events;
send the one or more event files to one or more event processing systems for testing the one or more events, the testing of the one or more events including:
executing the one or more events through the one or more event files,
testing the one or more events, using a first set of testing rules, to identify faults resulting from the testing of the one or more events, and
storing, in a risky events repository, details of only each of the one or more events that resulted in one of the identified faults, the details of each of the one or more events including:
an identification of the testing project,
an identification of the event, and an identification of the one or more parameters associated with the event and values of the one or more parameters;

generate at least one report including a result of the testing of the one or more events;

identify, from the details stored in the risky events repository, combinations of the values of the one or more parameters that are prone to errors;

automatically generate a second set of testing rules based on the identified combinations of the values of the one or more parameters that are prone to errors; and generate one or more additional testing projects including:
  using the details of the one or more events stored in the risky events repository to duplicate in the one or more additional testing projects at least a portion of the one or more events that resulted in one of the identified faults, wherein the one or more events that have a failure rate percent above a threshold in a specific system may be mandatory in testing next implementation of the system, and
  including the second set of testing rules in the one or more additional testing projects to test the duplicated one or more events.

10. The computer program product of claim 1, wherein the second set of testing rules are automatically generated from an algorithm that learns error patterns from the risky events repository.

* * * * *